INVENTOR:
WILLIAM R. DEHOLLANDER

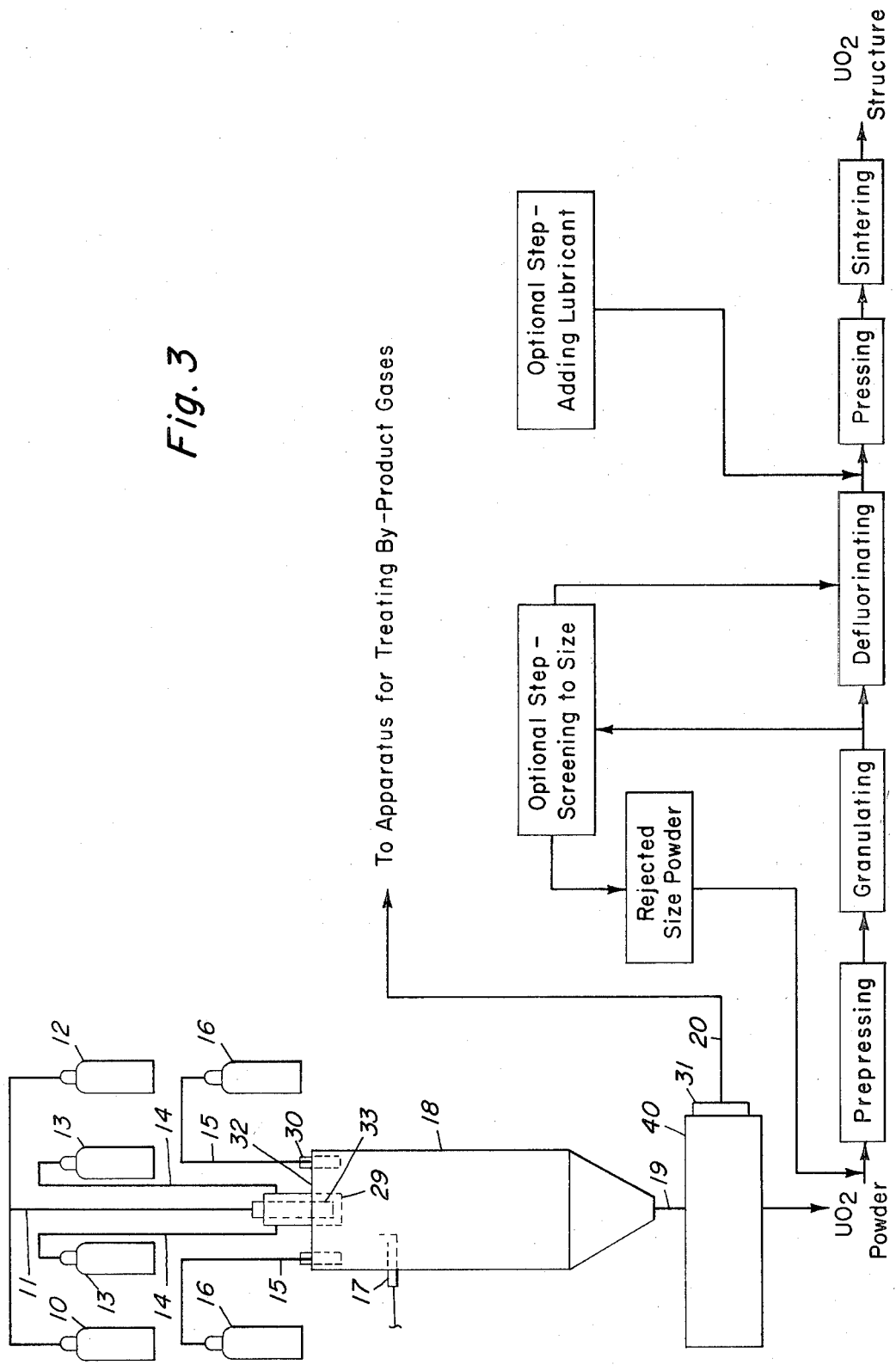

3,819,804
CONVERSION OF URANIUM HEXAFLUORIDE TO URANIUM DIOXIDE STRUCTURES OF CONTROLLED DENSITY AND GRAIN SIZE
William R. De Hollander, San Jose, Calif., assignor to General Electric Company
Filed June 16, 1971, Ser. No. 153,749
The portion of the term of the patent subsequent to Jan. 15, 1991, has been disclaimed
Int. Cl. C01g 43/02
U.S. Cl. 423—261
23 Claims

ABSTRACT OF THE DISCLOSURE

An integrated process for fabricating uranium dioxide structures of desired shape, density and grain size from enriched uranium hexafluoride is presented. Uranium hexafluoride is reacted with a reducing gas and an oxygen-containing carrier gas in a reduction-hydrolysis reaction in an active flame to yield a uranium dioxide rich powder of high surface area with fluoride impurities. The powder is separated from the gas stream after the reaction and is prepressed to a given shape by application of pressure and then broken into free flowing particles of a selected size range by granulation. Particles of powder outside the selected size range are screened out and can be combined with subsequent powder production for prepressing. The granulated powder is defluorinated by heating under a controlled atmosphere so that the high surface area of the powder is preserved. The defluorinated powder is then pressed into a structure of desired shape and sintered under a controlled atmosphere to yield a ceramic structure of desired density and grain size. The gas stream from the reaction of the uranium hexafluoride is treated to condense the hydrogen fluoride and water vapor as aqueous hydrofluoric acid. The process of this invention can be used with oxides of uranium of high surface area in any state of oxidation from uranium dioxide ($UO_2$) to uranium tritaoctoxide ($U_3O_8$) including uranium oxides produced by a post oxidation process converting the uranium dioxide rich powder to the higher oxide of uranium.

BACKGROUND OF THE INVENTION

Oxide products of uranium have various utilities including a preferred utility as fuels for nuclear reactors in the nuclear industry.

The performance of the fuel elements, traditionally enriched uranium dioxide structures clad in a metal container, is crucial to the practical success of the nuclear reactor. Nuclear power generation has imposed severe requirements on the performance of fuel in nuclear reactors, especially on properties of grain size and density of the fuel. It has been demonstrated that fine grain uranium dioxide structures are more subject to creep than large grain uranium dioxide structures. It has also been discovered that the density of the uranium dioxide is a very important physical property influencing the performance of the fuel. In fabricated forms, uranium dioxide is a ceramic capable of compaction to give a structure of desired density and a low impurity level.

The enrichment of uranium customarily takes place through use of the compound uranium hexafluoride so that a process is required for converting the enriched uranium hexafluoride into enriched uranium dioxide in a form which can be readily fabricated to structures having a low fluoride content and a desired density and grain size.

One current practice for converting uranium hexafluoride to uranium dioxide employs hydroylsis of uranium hexafluoride to give a solution of uranyl fluoride and hydrogen fluoride from which ammonium diuranate is precipitated by the addition of ammonia. After filtration the ammonium diuranate of high fluoride content is dissolved in nitric acid with fluoride decontamination of the resulting uranyl nitrate solution being accomplished by solvent extraction. From the resulting purified uranyl nitrate solution, ammonium diuranate is reprecipitated and then calcined to give $U_3O_8$ which in turn is reduced with hydrogen to give uranium dioxide.

Attempts have been made to replace this involved, expensive ammonium diuranate conversion process by gas phase reaction of uranium hexafluoride with a very successful method being described in copending U.S. patent application Ser. No. 77,446, now U.S. Pat. No. 3,796,672, entitled Process for Producing Uranium Dioxide Rich Compositions From Uranium Hexafluoride which is hereby incorporated by reference. The foregoing application was filed Oct. 2, 1970 in the names of W. R. DeHollander and A. G. Dada and assigned to the same assignee as the present invention.

This gas phase reaction producing a uranium dioxide rich powder has been found suitable for subsequent processing to structures of desired shape, density and grain size involving an optional step of defluorinating the powder if the powder has a high fluoride impurity, prepressing and then granulating the powder, pressing the powder into a structure of desired shape and size and sintering the structure under a controlled atmosphere as described in U.S. patent application Ser. No. 77,447, now U.S. Pats. No. 3,786,120, entitled Conversion of Uranium Hexafluoride to Uranium Dioxide Structures of Controlled Density and Grain Size which is hereby incorporated by reference. The foregoing application was filed Oct. 2, 1970 in the names of W. R. DeHollander and Harold H. Klepfer and assigned to the same assignee as the present invention.

In summary, the prior art ammonium diuranate practice described above for conversion of uranium hexafluoride to uranium dioxide does not provide a dependable, continuous, low cost process yielding uranium dioxide. For this reason it is desirable to integrate the gas phase reaction for flame conversion of uranium hexafluoride to uranium dioxide described in U.S. Pat. No. 3,796,672 to enable production of ceramic grade uranium dioxide structures suitable for nuclear applications in higher quantities per piece of equipment of given capacity and with even greater control over the final properties of the powder.

OBJECTS OF THE INVENTION

It is a principal object of this invention to provide a process for making uranium oxide structures from an enriched uranium hexafluoride precursor with the process enabling control of two critical parameters of density and grain size of the resulting uranium oxide structures.

Another object of this invention is to provide a method of processing an active uranium oxide rich powder involving prepressing the powder to yield a structure which is broken up and screened to selected size ranges, defluorinating the powder under a controlled atmosphere which gives a partial sinter of the powder to a prill, compacting the prill to a green structure and sintering the green structure to a solid structure so that the resulting uranium dioxide structure has a very high purity and surface area enabling control of the resulting density of the structure.

Still another object of this invention is to achieve a free flowing powder from an active uranium oxide rich powder by subjecting the active powder to prepressing to a given structure and breaking up the structure to increase the flow properties and bulk density of the powder before any subsequent processing of the powder is carried out.

Still another object of this invention is to provide a preferred processing sequence for uranium dioxide powder produced by flame conversion of uranium hexafluoride, with or without a subsequent oxidation step to a higher oxide of uranium, involving the steps of prepressing, granulating and defluorinating the powder followed by compaction of the uranium oxide powder to a green structure of desired configuration which is then sintered in a controlled atmosphere to give a solid uranium dioxide of controlled density and grain size.

SUMMARY OF THE INVENTION

In the practice of this invention, the enriched uranium hexafluoride is reacted with a reducing gas and an oxygen-containing carrier gas in a reduction-hydrolysis reaction in an active flame to yield a very high surface area powder rich in uranium dioxide. The powder is separated from the gaseous atmosphere resulting from the reaction and treated by prepressing and granulating to increase the flow and bulk density properties of the uranium dioxide rich powder. An optional step can be included to screen the powder to selected size range with return of powder outside the size range to be prepressed again. The prepressed-granulated powder is defluorinated by heating under a controlled atmosphere to remove fluoride impurities. The defluorinated powder is then pressed to a green shape of desired configuration and sintered under a controlled atmosphere to a ceramic structure of desired density and grain size. The sintering atmosphere is constituted so that it controls the oxygen to metal ratio of the sintered structure if the oxide content of the powder is outside specification. The gaseous atmosphere from the reduction-hydrolysis reaction is treated to condense the hydrogen fluoride and moisture constituents as aqueous hydrofluoric acid. The remaining gaseous constituents are disposed of, such as by burning the constituents in a flame to convert the constituents to an oxidized form where possible, and then releasing the constituents as treated to the atmosphere.

In another embodiment of this invention, the enriched uranium hexafluoride is reacted as described above to give a uranium dioxide rich powder which is then contacted with an oxygen-containing gas at or near reaction temperature resulting in the subsequent oxidation of the uranium dioxide rich powder to higher oxides of uranium as described in copending U.S. patent application Ser. No. 131,685, now U.S. Pat. No. 3,790,493 entitled Post Oxidation Process for Uranium Dioxide Rich Compositions which is hereby incorporated by reference. This application was filed Apr. 6, 1971 in the names of A. G. Dada, W. R. DeHollander and R. J. Sloat and assigned to the same assignee as the present invention. The uranium oxide rich power so produced is separated from the gaseous atmosphere resulting from the reaction sequence and treated according to the sequence set forth in the preceding paragraph. The gaseous atmosphere is also treated as in the preceding paragraph.

The foregoing objects and advantages of this invention will be apparent to a person skilled in the art from a reading of the following description of the invention, the appended claims and by reference to the accompanying drawings described immediately hereinafter.

DESCRIPTION OF THE DRAWINGS

FIG. 3 shows one schematic representation of apparatus for the practice of the steps in the process of the present invention.

DETAILED DESCRIPTION OF THE INVENTION

Figure 1:
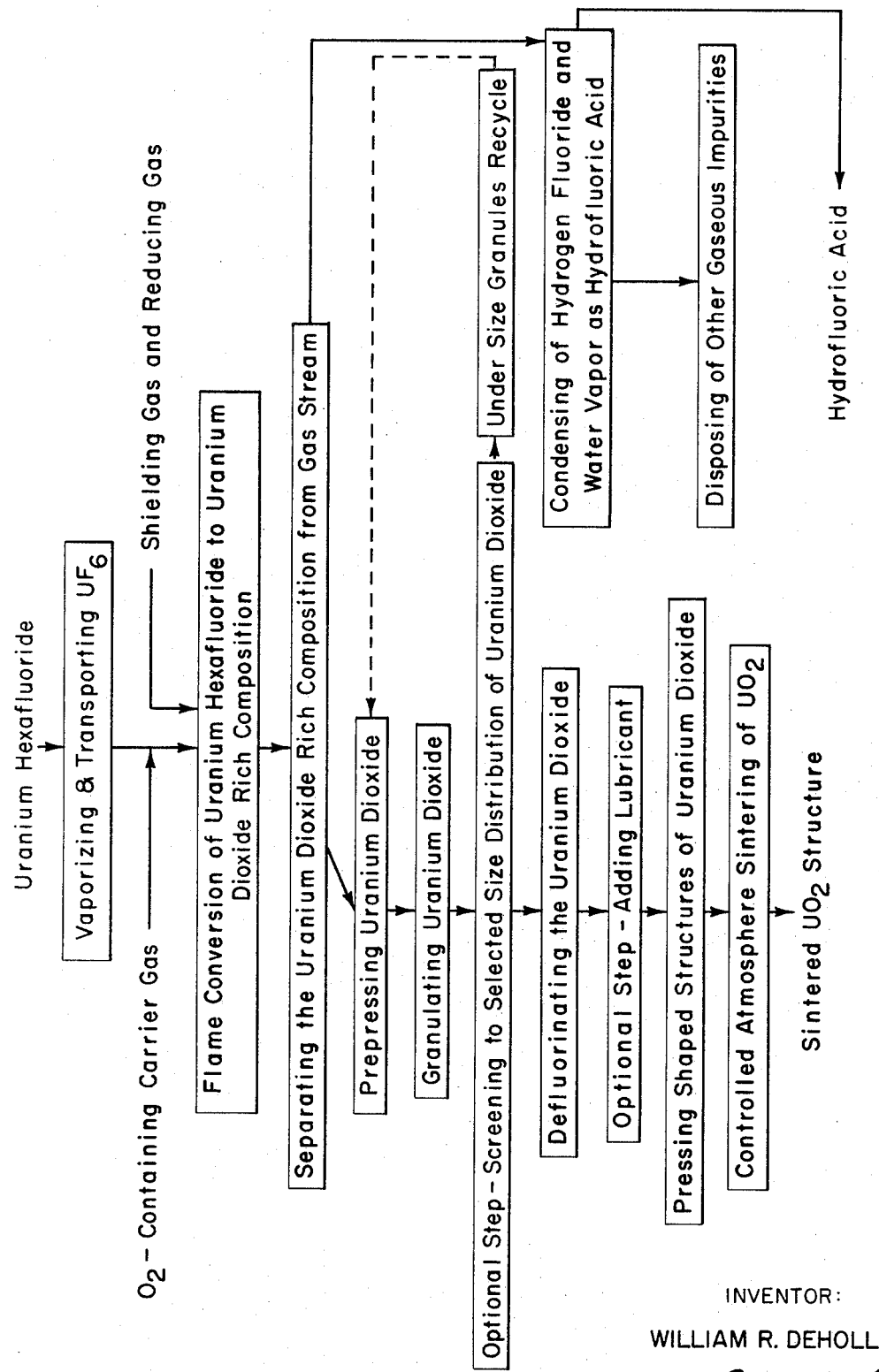
FIG. 1 presents a flow chart illustrating the steps in the process of the present invention which is described hereinafter in detail.

This invention presents a new process for producing uranium dioxide structures of desired configuration, density and grain size from an enriched uranium hexafluoride precursor. The description of this invention will be presented with headings corresponding to listed steps presented in the flow chart in FIG. 1. The alternative process presented in FIG. 2 will be discussed before presentation of a detailed example of the practice of this invention.

Vaporizing and Transporting $UF_6$

Uranium hexafluoride is a white waxy solid with a low vapor pressure at room temperature and pressure. Uranium hexafluoride is normally shipped in closed cylinders at room temperature and pressure, and it is removed from the cylinder either by melting and pouring out a liquid or by heating to sublime a gas. Since a gas phase is required in the practice of this invention in which a flame conversion process is used, any solid uranium hexafluoride is heated in the container to sublime the uranium hexafluoride after which it is transported to the reactor for conversion to uranium dioxide.

Flame Conversion of $UF_6$ to a $UO_2$ Rich Composition

The conversion step of this invention uses the process embodiments disclosed in the above-identified copending U.S. patent application Ser. No. 77,446. This process can be summarized as the conversion of gaseous uranium hexafluoride to uranium dioxide in the presence of an autogenous flame in a reactor which separately receives a mixture of uranium hexafluoride and an oxygen-containing carrier gas as a first gaseous reactant, a reducing gas as a second gaseous reactant, and a shielding gas temporarily separating the gaseous reactants and temporarily preventing substantial mixing and reaction between the gaseous reactants. After a sufficient cross diffusion of the gaseous reactants through the shielding gas, a flame reduction-hydrolysis reaction results between the uranium hexafluoride, the oxygen-containing carrier gas and the reducing atmosphere. The reaction flame is removed, or lifted away, from the inlet used to introduce the reactants to the reactor.

Referring now to FIG. 3, a source of uranium hexafluoride gas, such as cylinder 10, is fed in line 11 along with an oxygen-containing carrier gas from cylinder 12 so that a first reactant comprising a mixture of uranium hexafluoride and the oxygen-containing carrier gas is achieved in line 11 and introduced to reactor 18 through tube 33. A shielding gas from cylinders 13 is fed into lines 14 and introduced to the reactor 18 through tube 29 so that the shielding gas surrounds the first reactant as the first reactant is introduced to the reactor 18. A second reactant, a reducing gas, is fed from cylinders 16 into lines 15 and introduced to the reactor 18 through tubes 30 here shown in duplicate with one tube 30 on each side of the central inlet on the reactor cover 32.

Any of the embodiments presented in the aforementioned U.S. Pat. No. 3,796,672, for the flame conversion of uranium hexafluoride to uranium dioxide rich compositions can be utilized in this invention.

This flame conversion of uranium hexafluoride avoids the build-up of reaction products, largely solid uranium oxides, at the tips of the tubes carrying the uranium hexafluoride-carrier gas mixture and the shielding gas due to the fact that the conversion flame is maintained away from the tips of these tubes. The reaction zone is preferably heated initially to a temperature of at least about 100° C. before the conversion reaction is started so there will be no condensation of water vapor on the walls of the reactor which would tend to result in agglomeration of the uranium dioxide particles on the walls of the reactor.

The velocity of the gaseous mixture of uranium hexafluoride and the oxygen-containing carrier gas is important in the practice of this step of the invention, and the rate of flow of this mixture should exceed the rate of flame propagation so the flame is maintained away from this tube. The distance the flame is removed from the tube introducing the uranium hexafluoride-carrier gas mixture is critical to the shape of the flame. If the distance is too great there tends to be incomplete conversion of the uranium hexafluoride to oxide, and if the distance is too small the flame tends to burn too close to the tube, eventually leading to a build-up of reaction products and plugging of the tube.

This conversion step of the present invention is based on the following apparent overall reduction-hydrolysis reaction:

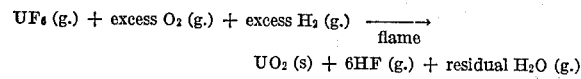

$$UF_6 (g.) + \text{excess } O_2 (g.) + \text{excess } H_2 (g.) \xrightarrow{\text{flame}}$$
$$UO_2 (s) + 6HF (g.) + \text{residual } H_2O (g.)$$

The reactor used in this step of the process can be any of the reactors and reactor nozzles disclosed in the aforementioned U.S. Pat. No. 3,796,672 or in U.S. patent application Ser. No. 131,684 entitled Nozzle for Chemical Reaction Processes which is hereby incorporated by reference. The latter application was filed Apr. 6, 1971 in the name of A. G. Dada and assigned to the same assignee as is the present invention.

Separating $UO_2$ Rich Composition From Gas Stream

Referring to FIG. 3, the powder which is formed in the reactor 18 is very fine and settles from the gas phase toward the bottom of reactor 18 where the powder is withdrawn from the reactor in line 19 to a chamber 40 holding a series of Monel® filters 31 which are periodically back pulsed. These filters withold the uranium dioxide while leaving the gas stream free to exit from chamber 40 into line 20.

Condensing Hydrogen Fluoride and Water Vapor as Hydrofluoric Acid

The gas stream in line 20 can be treated to recover the hydrogen fluoride and water vapor as a hydrofluoric acid which will not be presented in detail. One representative process is set forth in U.S. Pat. No. 3,786,120 which also covers disposal of the other gases such as by burning.

Prepressing, Granulating and Optional Step of Screening to a Selected Size Distribution of $UO_2$ In order to obtain desirable flow property and a low bulk density for the uranium dioxide powder, the powder is prepressed and granulated by any of the known practices. The prepressing involves application of pressures to given quantities of the powder to form green, uncured shapes in any of a wide variety of devices using forces which are substantially below the final forming pressures used to give compacted structures capable of being sintered. Representative shapes are cylinders, cubes, parallelepipeds, etc., of various dimensions. In the granulation step the prepressed bodies are broken up such as by granulating and passed through a screen of given mesh size to produce a free flowing granular powder. Powder falling outside the desired size ranges can be recycled and combined with new powder from the reactor 18 and again prepressed into new compacts.

The following is representative of the preliminary processing steps of prepressing and granulating the uranium dioxide powder before it is pressed in desired shapes for sintering. The uranium dioxide powder is prepressed in a press at pressures from about 500 to about 3000 pounds per square inch, preferably about 1000 pounds per square inch, into the aforementioned desired shapes. These desired shapes are then granulated in a granulator and screened through a screen having openings in the range of about 6 to about 20 mesh. This processing sequence yields uranium dioxide powder having improved flow and bulk density properties.

The sequence of this process is important since the free flowing powder produced after the prepressing and granulating steps results in greater efficiency in the defluorination step. The powder can be passed through a slightly inclined, rotating, defluorinating furnace in a manner enabling fuller utilization of the furnace and resulting in an increased quantity of powder passing through the furnace.

Defluorinating the $UO_2$

The uranium dioxide rich powder will contain a relatively low fluoride concentration varying up to no more than about 50,000 parts per million depending on the parameters selected for the flame conversion step. Fluoride impurities in uranium dioxide compositions are undesirable as these impurities interfere with full development of the potential nuclear properties of the uranium dioxide. Further fluoride impurities in uranium dioxide structures can attack the cladding during operation of nuclear reactors and start corrosion of the cladding leading to failure of the cladding.

Referring again to FIG. 3, the defluorinating step utilized in the practice of this invention is conducted on powder after completion of the prepressing and granulating steps (and optional step of screening to size if used). The furnace used in the defluorination is designed to have excellent gas-solids contact such as an inclined, rotary kiln type of furnace which circulates the powder so that the need for diffusion of the defluorinating gas into powder is minimized. The atmosphere of the furnace is controlled so as to be non-oxidizing, and can be either (1) a reducing gas containing water vapor such as wet hydrogen or wet dissociated ammonia, or (2) an alcohol vapor with or without a carrier gas as disclosed in copending U.S. patent application Ser. No. 55,744, now U.S. Pat. No. 3,755,188, filed July 17, 1970 in the name of L. N. Grossman and D. A. Brigham and assigned to the assignee of this invention which is hereby incorporated by reference, or (3) a mixture of about 2 to about 95 percent hydrogen by volume with the balance being carbon dioxide as disclosed in copending U.S. patent application Ser. No. 62,308 filed Aug. 10, 1970 (now abandoned in light of continuation-in-part application Ser. No. 358,738) in the name of Yogesh Nivas and assigned to the assignee of this invention which is hearby incorporated by reference.

This defluorination step achieves the removal of fluoride ions from the uranium dioxide rich powder to a concentration of about 300 parts per million or less. Where alcohol vapor, with or without a carrier gas, or a mixture of carbon dioxide and hydrogen constitute the defluorinating atmosphere, it has been found that the defluorinated powder has the approximate, initial surface area of the powder preserved throughout the defluorination process. When the defluorinating atmosphere is a mixture of carbon dioxide and hydrogen within the foregoing range, the defluorinated powder has a controlled stoichiometric oxygen to uranium ratio within the range of $2.1:1 \pm .07:1$.

As applied to the process of this invention where an alcohol vapor containing atmosphere is selected as the defluorinating atmosphere, the temperature of this defluorinating step is generally between about 600° F. and about 1600° F. and preferably between about 600° F. and about 1100° F. where it is desired to have a powder of high surface area. Where the atmosphere used for defluorination contains only vaporized alcohol, a higher temperature up to about 1600° F. can be utilized with a particularly preferred range of temperature being about 1200 to about 1600° F. Where it is important to preserve the surface area of the powder being defluorinated, a preliminary drying step involving heating under a dry, inert atmosphere (e.g., nitrogen, helium, neon, argon, air, oxygen and mixtures thereof) at a temperature in the range of about 200 to about 750° F. is practiced.

Where an atmosphere of a mixture of carbon dioxide and hydrogen is selected as the defluorinating atmosphere, the step is carried out at a temperature in the range of about 750 to about 1470° F. The atmosphere controls the partial pressure of oxygen over the particulate composition during heating and removes excess oxygen giving a controlled oxygen-to-metal ratio for the treated composition.

After being defluorinated to a fluoride ion content of about 300 parts per million by weight or less, the uranium dioxide exists in powder form with a particle size of less than about 1 micron, and is ready for immediate fabrication into structures such as pellets of various shapes suitable for commercial utilization without further comminution techniques. The uranium dioxide powder has a surface area of about 4 to about 6 square meters per gram.

It has been observed that the defluorination step gives a partial soft sintering of the powder, but this sintering creates a bond such that the powder will break up on application of moderate amounts of force. This partially sintered powder is referred to as a prill which means that a group of particles of powder are tied up in small balls. The prill has excellent flow properties and needs no further comminution prior to the pressing operation described below. Even more striking is that the prill maintains an excellent sintering activity.

The sequence of this process produces very desirable improvements in the processing of uranium oxide powders. No comminution of the uranium oxide powder is needed in this process. The desired particle size of the uranium oxide is achieved before any thermal treatment, and this has the advantage that rejected powder outside the desired particle size range can be recycled to the prepressing step. The flow property of the prill is very desirable enabling the production of a more uniform product from the subsequent steps of pressing and sintering to a compact structure. Another striking advantage of the prill is the elimination of dust and spread of fine uranium oxide particles in the air or removing the uranium oxide from the defluorinating furnace and in the subsequent processing steps.

Optional Step—Adding Lubricant

As an optional step, a lubricant can be added to the prill at this point in the process with a representative lubricant being Sterotex®, a vegetable stearate which serves to lubricate the die at pressing time. The lubricant can be added by rolling the powder in a drum on a set of rolls. The rolling time is kept to a minimum sufficient to give a good distribution of the lubricant without destroying the structure of the prill which can break down by attrition when subjected to excessive rolling.

Pressing Shaped Structures of $UO_2$

The uranium dioxide, with or without an added lubricant, is formed by various methods into the desired shapes for sintering. Representative of these shapes are cylinders, cubes, parallelepipeds, etc., of various dimensions. Representative forming techniques include single end pressing, double ended pressing, isostatic pressing or extrusion of the desired green shapes. In general, the forming pressure at this time is greater than the prepressing pressures but less than pressures producing laminations. Representative pressures applied to the ceramic powders to produce green shapes are in the range of about 10,000 to about 40,000 pounds per square inch. Representative dimensions of one preferred green shape of cylindrical pellets made by this invention capable of utilization as a nuclear fuel are pellets of about ½ an inch in diameter and a height of about ½ an inch weighing about 10 grams.

Controlled Atmosphere Sintering of $UO_2$

The green shapes of uranium dioxide are fired in a heated furnace under a controlled atmosphere to give sintered structures of high density and controlled grain size. The green shapes have very active uranium dioxide particles so that a variety of firing schedules may be employed in the sintering. As used herein, the term "active" means particles having high surface area which readily sinter to compact structures. In general, depending on the sintering atmosphere, the green shapes are heated to a temperature in the range of about 900 to about 1700° C. from about half an hour to about 4 hours. Preferred temperature ranges can be selected from the foregoing range to develop particular properties of the sintered ceramic. The atmosphere maintained in the furnace can be selected from either (1) a reducing gas saturated with water vapor such as wet hydrogen or wet dissociated ammonia, or (2) a mixture of about 0.5 to about 90 percent hydrogen by volume with the balance being carbon dioxide as disclosed in copending U.S. patent application Ser. No. 62,353, filed Aug. 10, 1970 (now abandoned in light of continuation-in-part application Ser. No. 358,737) in the names of W. R. DeHollander and Yogesh Nivas and assigned to the assignee of this invention.

If a small grained, high density structure is desired and a wet hydrogen or wet ammonia atmosphere is used for sintering, the green shapes are heated to a temperature in the range of about 1650° C.±50° C. for short times of about one to about two hours, with an additional ½ hour being used to bring the furnace to this temperature range and an additional ½ hour being used to cool the furnace from this temperature range. Another alternative for sintering the green shapes is to heat the shapes to a temperature in the range of about 1050° C.±50° C. for longer periods of about 8 to about 12 hours. This firing cycle also has additional ½ hour periods each for bringing the furnace to the temperature range and cooling the furnace from this temperature range. This thermal processing gives a small grained, higher density structure.

When the sintering atmosphere is a mixture of carbon dioxide and hydrogen in the foregoing range, the powders are sintered to very high density by heating to a temperature in the range of about 900 to about 1500° C. This gives a sintered uranium dioxide structure having a controlled, nearly stoichiometric ratio of oxygen to metal atoms.

Figure 2:
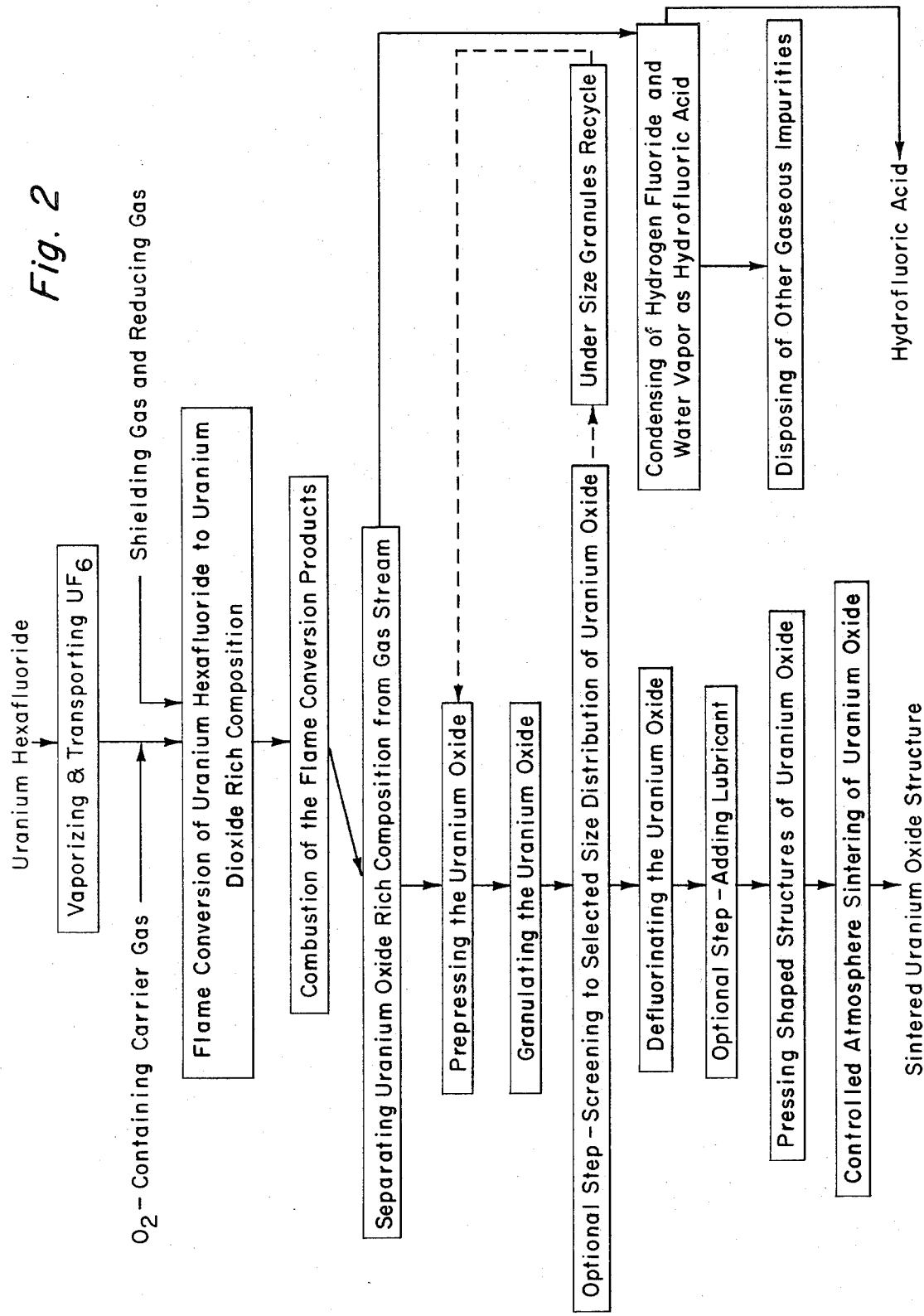
FIG. 2 presents a flow chart illustrating the steps in the process of the present invention in which a post oxidation process is used.

The following is a summary of the range of properties achieved for the sintered uranium dioxide structures:

density: about 90 to about 99 percent of theoretical density
grain size: about 1 to about 8 microns
fluoride ion content: less than about 25 parts per million
gas content: less than about 10 microliters/gram FIG. 2 presents another embodiment of the process of this invention having identical steps to FIG. 1 except that the additional step of oxidizing the flame conversion products is practiced which converts the uranium dioxide rich composition to a higher oxide of uranium as described in copending U.S. patent application Ser. No. 131,685, now U.S. Pat. No. 3,790,493, entitled Post Oxidation Process for Uranium Dioxide Rich Powder filed Apr. 6, 1971 in the names of A. G. Dada, W. R. DeHollander and R. J. Sloat.

The following example is offered to show a representative process of the disclosed invention as carried out to produce uranium dioxide structures from uranium hexafluoride. The following example is offered to be representative of the teaching of this process and in no way serves to limit the teaching of this invention.

EXAMPLE 1

Two pounds of a uranium dioxide powder produced according to the practice of Example 54 of U.S. Pat. No. 3,796,672 is used in this example as a starting material. The following is a summary of the properties for the uranium dioxide rich composition: a fluoride ion content of 24,000 parts per million, an average particle size of 0.5 microns, an oxygen/uranium ratio greater than 2.1 and a bulk density of 0.48 gm./cm.$^3$.

The powder is isostatically pressed at 1000 pounds per square inch to yield small right cylinders of ¾ inch in diameter and three inches in height weighing about 500 grams. The cylinders are broken into small particles by using a pestle and passed through a screen having openings of 20 mesh.

The powder is placed in a stationary bed furnace which is heated to 600° C. in two hours and held at that temperature for four hours under a controlled atmosphere comprising a mixture of hydrogen and carbon dioxide varying from three percent hydrogen—ninety-seven percent carbon dioxide by volume to fifty percent hydrogen-fifty percent carbon dioxide by volume. The powder is then cooled under a controlled atmosphere of dry hydrogen in three hours to room temperature. The powder is in the form of a prill and is removed from the furnace and mixed with a lubricant of Sterotex (a vegetable stearate). The powder is then poured into a die and pressed to 27,000 pounds per square inch to form right cylinder structures of 0.5 inches in diameter and 0.7 inches in height. The structures are sintered at 1650° C. for four hours under a controlled atmosphere of wet hydrogen. The properties of the resulting $UO_2$ structures include a density of 95.9 percent of theoretical density, a grain size of seven microns, a fluoride ion content of less than one part per million and a gas content of about ten microliters/gram of ceramic.

As will be apparent to those skilled in the art, various modifications and changes may be made in the method described herein. It is accordingly the intention that the invention be construed in the broadest manner within the spirit and scope as set forth in the accompanying claims.

What is claimed is:

1. The process of fabricating ceramic structures of uranium dioxide from gaseous uranium hexafluoride having the steps of:
   (a) preparing a uranium dioxide rich powder and gaseous reaction products from uranium hexafluoride in the presence of an active flame in a reactor by
      (i) introducing a mixture of uranium hexafluoride and an oxygen-containing carrier gas into the reaction zone as a first gaseous reactant,
      (ii) separately introducing a reducing gas into the reaction zone as a second gaseous reactant, and
      (iii) separately introducing a shielding gas into the reaction zone between the first gaseous reactant and the second gaseous reactant which temporarily prevents substantial mixing and reaction between the first gaseous reactant and the second gaseous reactant until sufficient cross diffusion of the reactants occurs as the reactants pass through the reaction zone resulting in a reaction producing a particulate uranium dioxide rich composition and gaseous reaction products;
   (b) separating the uranium dioxide rich powder from the gaseous reaction products produced in the foregoing step;
   (c) prepressing the uranium dioxide rich powder to a structure of desired shape and dimensions;
   (d) granulating the structure of step (c) to produce a free flowing granular powder;
   (e) defluorinating the granulated uranium dioxide rich powder under a controlled atmosphere to give a uranium dioxide powder;
   (f) pressing the uranium dioxide powder to a structure of desired shape and dimensions; and
   (g) sintering the structure of step (f) in a controlled atmosphere to give a uranium dioxide structure of controlled density and grain size.

2. The process of claim 1 in which the controlled atmosphere in the defluorinating step is comprised of wet hydrogen.

3. The process of claim 1 in which the controlled atmosphere in the defluorinating step is comprised of vaporized alcohol.

4. The process of claim 1 in which the controlled atmosphere in the defluorinating step is comprised of vaporized alcohol with a carrier gas.

5. The process of claim 1 in which the controlled atmosphere in the defluorinating step is comprised of a mixture of carbon dioxide and hydrogen.

6. The process of claim 1 in which the controlled atmosphere in the defluorinating step is comprised of wet dissociated ammonia.

7. The process of claim 1 in which the sintering atmosphere is comprised of wet hydrogen.

8. The process of claim 1 in which the sintering atmosphere is comprised of a mixture of carbon dioxide and hydrogen.

9. The process of claim 1 in which the gaseous reaction byproducts are treated to recover the hydrogen fluoride and water vapor as a hydrofluoric acid.

10. The process of claim 1 in which the granular powder of step (d) is screened to a selected size range.

11. The process of claim 1 in which a lubricant is mixed with the defluorinated powder of step (e).

12. The process of claim 1 in which the reaction products of step (a) are oxidized in an oxygen rich zone in the reactor to convert uranium dioxide rich powder to a higher oxide of uranium.

13. The process of fabricating ceramic structures of uranium dioxide from gaseous uranium hexafluoride having the steps of:
   (a) preparing a uranium dioxide rich powder and gaseous reaction products from uranium hexafluoride in the presence of an active flame in a reactor by
      (i) introducing a mixture of uranium hexafluoride and an oxygen-containing carrier gas into the reaction zone as a first gaseous reactant,
      (ii) separately introducing a reducing gas into the reaction zone as a second gaseous reactant, and
      (iii) separately introducing a shielding gas into the reaction zone between the first gaseous reactant and the second gaseous reactant which temporarily prevents substantial mixing and reaction between the first gaseous reactant and the second gaseous reactant until sufficient cross diffusion of the reactants occurs as the reactants pass through the reaction zone resulting in a reaction producing a particulate uranium dioxide rich composition and gaseous reaction products;
   (b) introducing a third gaseous reactant comprising an oxygen-containing gas into contact with the uranium dioxide rich composition and the gaseous reaction products resulting from step (a) thereby converting the residual reducing gas in the reaction zone to an oxidized form and oxidizing the uranium dioxide rich composition to a uranium oxide rich composition;
   (c) separating the uranium oxide rich composition from the gaseous reaction products produced in the foregoing steps;
   (d) prepressing the uranium oxide rich powder to a structure of desired shape and dimensions;
   (e) granulating the structure of step (d) to produce a free flowing granular powder;
   (f) defluorinating and reducing the oxygen to metal ratio of the granulated uranium oxide rich powder under a controlled atmosphere to give a uranium dioxide powder;
   (g) pressing the uranium dioxide powder to a structure of desired shape and dimensions; and
   (h) sintering the structure of step (g) in a controlled atmosphere to give a uranium dioxide structure of controlled density and grain size.

14. The process of claim 13 in which the controlled atmosphere in the defluorinating step is comprised of wet hydrogen.

15. The process of claim 13 in which the controlled atmosphere in the defluorinating step is comprised of vaporized alcohol.

16. The process of claim 13 in which the controlled atmosphere in the defluorinating step is comprised of vaporized alcohol with a carrier gas.

17. The process of claim 13 in which the controlled atmosphere in the defluorinating step is comprised of a mixture of carbon dioxide and hydrogen.

18. The process of claim 13 in which the controlled atmosphere in the defluorinating step is comprised of wet dissociated ammonia.

19. The process of claim 13 in which the sintering atmosphere is comprised of wet hydrogen.

20. The process of claim 13 in which the sintering atmosphere is comprised of a mixture of carbon dioxide and hydrogen.

21. The process of claim 13 in which the gaseous reaction products are treated to recover the hydrogen fluoride and water vapor as hydrofluoric acid.

22. The process of claim 13 in which the granular powder of step (e) is screened to a selected size range.

23. The process of claim 13 in which a lubricant is mixed with the defluorinated powder of step (f).

References Cited

UNITED STATES PATENTS

| | | | |
|---|---|---|---|
| 3,365,274 | 1/1968 | Carpenter et al. | 23—202 |
| 3,382,042 | 5/1968 | Richardson et al. | 23—202 |
| 3,504,058 | 3/1970 | Masseldt | 264—0.5 |
| 3,564,081 | 2/1971 | Francois et al. | 264—0.5 |
| 3,375,306 | 3/1968 | Russell | 264—0.5 |
| 3,000,703 | 9/1961 | Brugger | 23—140 |

FOREIGN PATENTS 10,095   5/1966   Japan.

CARL D. QUARFORTH, Primary Examiner

R. L. TATE, Assistant Examiner

U.S. Cl. X.R.

264—0.5